(12) United States Patent
LoGalbo et al.

(10) Patent No.: US 7,161,921 B2
(45) Date of Patent: Jan. 9, 2007

(54) RELATIVE ADJUSTMENT VALUE FOR INBOUND TIME-SLOTTED TRANSMISSIONS

(75) Inventors: Robert D. LoGalbo, Hoffman Estates, IL (US); Alan P. Conrad, St. Charles, IL (US); Darrell J. Stogner, Plantation, FL (US)

(73) Assignee: Motorola, Inc., Schaumburg, IL (US)

( * ) Notice: Subject to any disclaimer, the term of this patent is extended or adjusted under 35 U.S.C. 154(b) by 383 days.

(21) Appl. No.: 10/407,349

(22) Filed: Apr. 4, 2003

(65) Prior Publication Data

US 2004/0196811 A1  Oct. 7, 2004

(51) Int. Cl.
*H04J 3/06* (2006.01)
(52) U.S. Cl. ............... 370/337; 370/347; 370/443
(58) Field of Classification Search ........ 370/337, 370/347, 294, 522, 350, 329, 503, 508, 519, 370/443, 458, 478; 455/67.6, 500, 18
See application file for complete search history.

(56) References Cited

U.S. PATENT DOCUMENTS

| | | | | |
|---|---|---|---|---|
| 3,843,483 A | * | 10/1974 | Solomon et al. ......... | 156/380.3 |
| 4,414,661 A | * | 11/1983 | Karlstrom ................ | 370/332 |
| 5,361,398 A | * | 11/1994 | Christian et al. .......... | 455/503 |
| 5,363,373 A | * | 11/1994 | Nakahara et al. .......... | 370/314 |
| 5,509,016 A | * | 4/1996 | Muller ..................... | 370/350 |
| 5,663,958 A | * | 9/1997 | Ward ....................... | 370/347 |
| 5,689,502 A | * | 11/1997 | Scott ....................... | 370/281 |
| 5,737,330 A | * | 4/1998 | Fulthorp et al. ........... | 370/346 |
| 6,233,257 B1 | * | 5/2001 | Yoshida et al. ............ | 370/508 |
| 6,621,806 B1 | * | 9/2003 | Keller et al. .............. | 370/329 |

* cited by examiner

*Primary Examiner*—Ricky Ngo
*Assistant Examiner*—Duc Duong
(74) *Attorney, Agent, or Firm*—Terri S. Hughes; Indira Saladi

(57) ABSTRACT

Disclosed are methods for adjustment values. In one embodiment, a cumulative adjustment value is provided in memory, an inbound signal is transmitted to a base station during a random access opportunity, and a relative adjustment value is received from the base station. Then, the relative adjustment value is summed with the cumulative adjustment value to create a new cumulative adjustment value which is stored in the memory. Finally, a subsequent inbound signal is transmitted using the new cumulative adjustment value during a reserved access opportunity.

9 Claims, 4 Drawing Sheets

RELATIVE ADJUSTMENT VALUE FOR INBOUND TIME-SLOTTED TRANSMISSIONS

FIELD OF THE INVENTION

The present invention relates generally to an improved adjustment value for inbound time-slotted transmissions, and particularly for inbound time division multiple access transmissions.

BACKGROUND OF THE INVENTION

Time division multiple access ("TDMA") systems have multiple subscriber units transmitting in reserved slots to a base station. As illustrated in FIG. 1, these subscriber units $100_1$–$100_n$ are of varying distances from the base station 102. If a first subscriber unit $100_1$ located far from the base station 102 transmits a burst in one reserved slot and a second subscriber unit $100_2$ located near to the base station 102 transmits a burst in the following reserved slot, interference is likely to occur. The end of the burst from the first subscriber unit $100_1$ located far from the base station 102 may lag and interfere with the beginning of the burst from the second subscriber located near the base station.

Allowing for the worst-case propagation delay any subscriber unit 100 may be from the base station 102, i.e., a shortened inbound burst, can prevent this interference. That way, if a subscriber unit 100 is located far from the base station 102, the end of its inbound burst will end in the allotted time reserved for that slot.

Another way to remedy the problem is to advance the transmission of the subscriber unit 100 located far from the base station 102 in such a manner that it does not lag into the transmission of the subscriber unit 100 located near the base station 102 (i.e., the subscriber unit 100 located far from the base station 102 would transmit sooner relative to the outbound bursts than the subscriber unit 100 located near the base station 102). The advantages of the latter method is that system throughput is increased. The room in the inbound burst that would have been allotted for worst-case propagation delay can now be assigned to signaling.

Current time advance methods require that the base station estimate the delay of the inbound signal, transmit an absolute adjustment value to the subscriber unit 100 while keeping a running history of the adjustment values for that subscriber unit 100. TDMA systems (e.g., iDEN, GSM, GPRS, etc.) rely on this method. A disadvantage to the current time advance methods requires the base station 102 to keep a history for each subscriber unit 100, thus burdening it with memory management and fast retrieval times for real-time operation. Furthermore, because the adjustment values are absolute, when channel errors occur, the recovery time until the adjustment values are accurate again is long. The longer it takes for a subscriber unit 100 to recover its time adjustment, the more likely interference will result. Also, because it takes longer for the subscriber unit 100 to recover its time adjustment, a greater number of adjustment values need to be transmitted by the base station 102 in order for the subscriber unit to recover its time advance, thus negatively impacting system throughput.

Thus, there exists a need for a subscriber unit to recover its time advance/delay as quickly as possible.

BRIEF DESCRIPTION OF THE FIGURES

A preferred embodiment of the invention is now described, by way of example only, with reference to the accompanying figures in which.

DETAILED DESCRIPTION OF THE EMBODIMENTS OF THE PRESENT INVENTION

Figure 1:
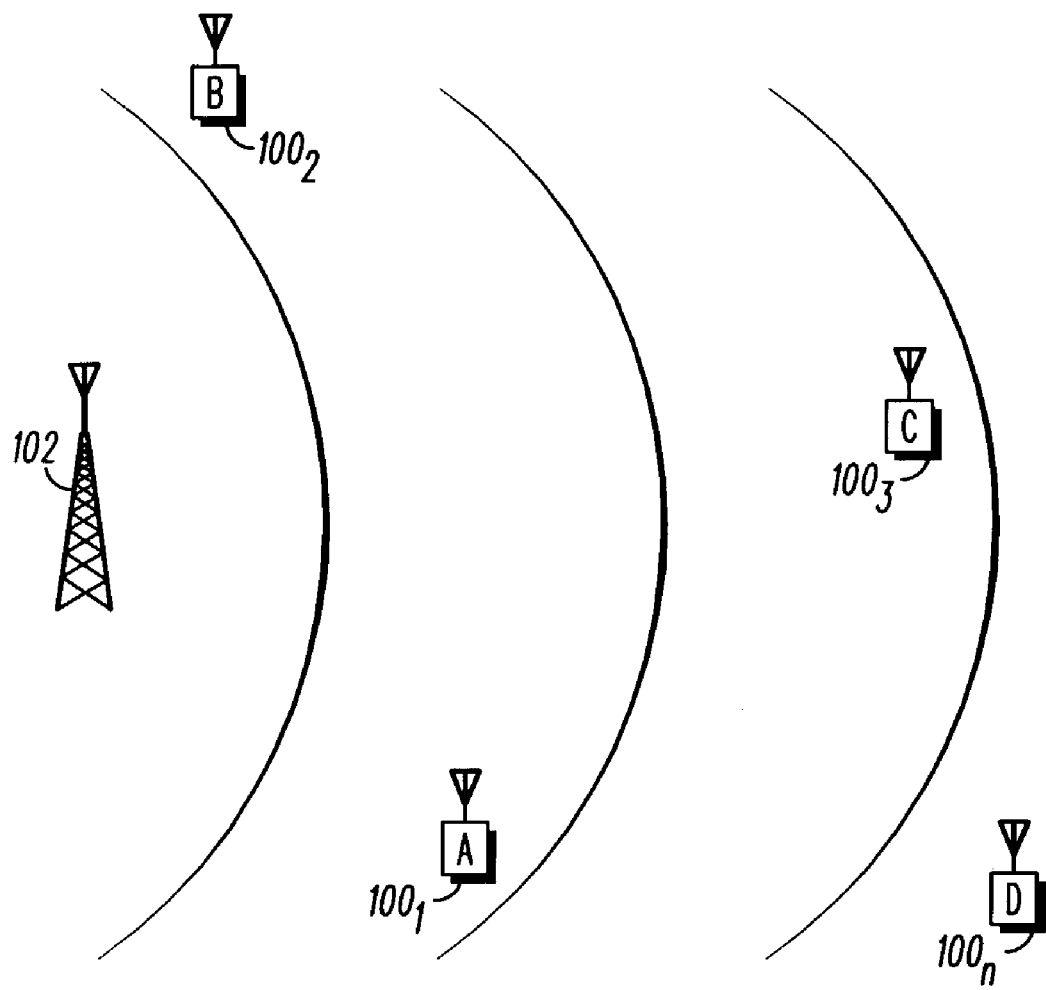
FIG. 1 illustrates a system diagram having multiple subscriber units at varying distances from a base station.

It will be appreciated that for simplicity and clarity of illustration, elements shown in the figures have not necessarily been drawn to scale. For example, the dimensions of some of the elements are exaggerated relative to each other. Further, where considered appropriate, reference numerals have been repeated among the figures to indicate identical elements.

The present invention provides an improved adjustment value (e.g., transmit time advance/delay) for inbound time-slotted transmissions. The present invention is discussed with respect to two embodiments: when the subscriber unit 100 does not comprise a synchronized clock with the base station, and when the subscriber unit 100 does comprise a synchronized clock with the base station (e.g., the subscriber unit comprising a GPS receiver). It should be noted that the subscriber unit and/or the base station may comprise a storage medium having stored thereon a set of instructions which, when loaded into a hardware device (e.g., a microprocessor), causes the hardware device to perform the functions of the present invention. The present invention can be implemented in at least one of hardware, firmware and/or software.

Let us first discuss the first embodiment of the present invention in which the subscriber unit 100 does not comprise a synchronized clock with the base station. In accordance with the present invention, if the subscriber unit 100 does not comprise a synchronized clock with the base station, the base station 102 estimates the delay of an inbound signal from the subscriber unit 100 and transmits a relative adjustment value to the subscriber unit 100. In the present invention, the base station 102 does not keep a running history of the location of the subscriber unit 100 based on the adjustment values; rather, after transmitting the relative adjustment value, the base station 102 discards the relative adjustment value. Because the base station 102 does not keep a running history of the adjustment values for each subscriber unit 100, it is not burdened with memory management and fast retrieval times as in the prior art. Furthermore, because the adjustment values are relative, when channel errors occur, the recovery time is shorter than the recovery time using absolute adjustment values, as in the prior art. In turn, the amount of signaling is reduced, and the system throughput is increased with the present invention.

Figure 2:
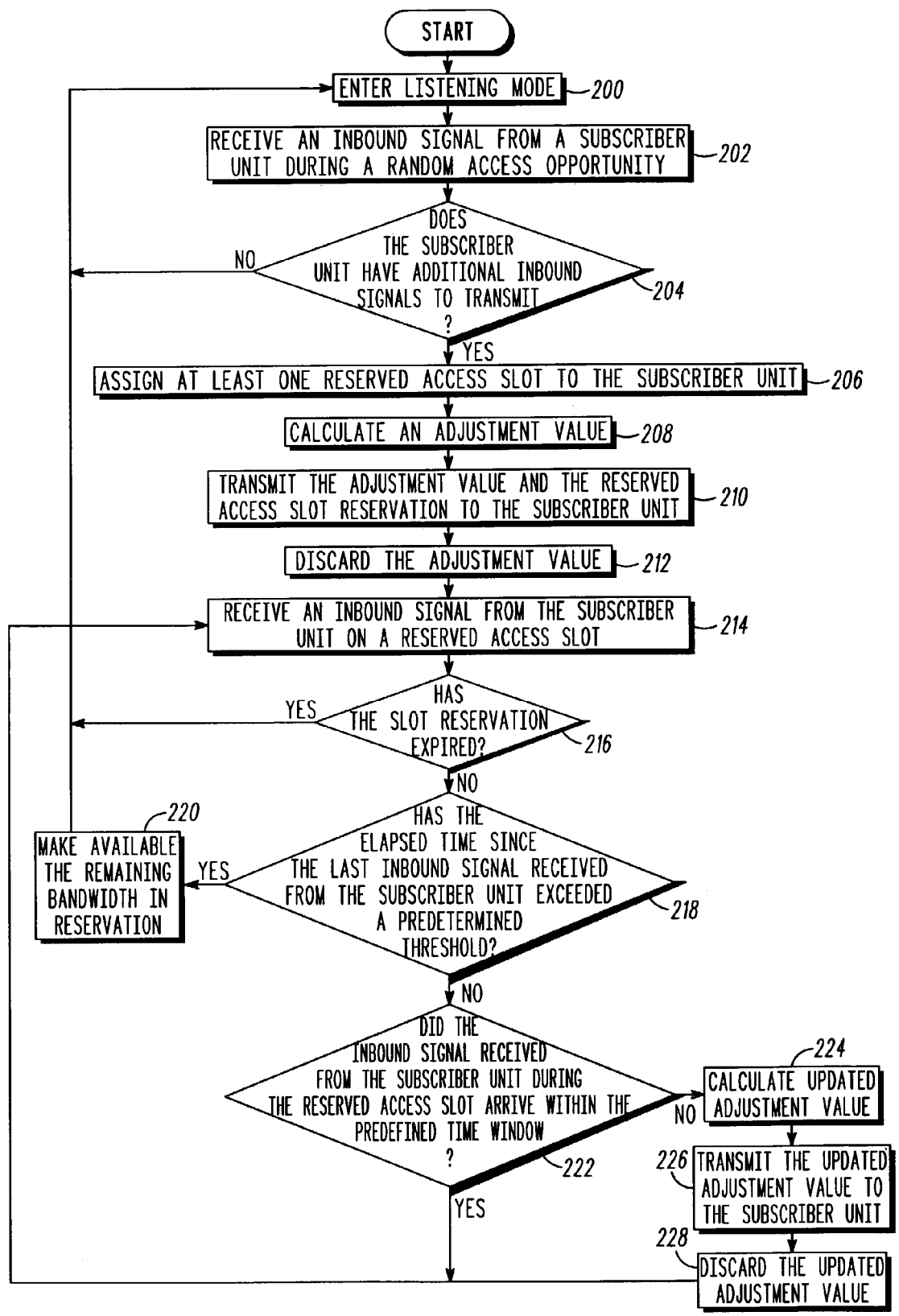
FIG. 2 illustrates a flowchart of the operation of the base station in accordance with the first embodiment of the present invention.

FIG. 2 illustrates the operation of the base station in accordance with the first embodiment of the present invention. As illustrated in FIG. 2, the base station 102 enters a listening mode and idly waits for an inbound signal to be transmitted on the air interface from a subscriber unit 100 (at step 200). Upon receipt of the inbound signal from a subscriber unit 100 during a random access opportunity (at step 202), the base station 102 determines whether the subscriber unit 100 has at least one additional inbound signal to transmit on the air interface (at step 204); typically, the base station 102 determines whether the subscriber unit has at least one additional inbound signal to transmit based on the inbound signal received from the subscriber unit 100 during the random access opportunity (e.g., the subscriber unit 100 requests thirty additional time slots to transmit an IP packet). Typically, the random access burst is shorter than a reserved access burst to account for worst-case distance from the base station 102. For ease of explanation, the present invention assumes that each subscriber unit 100 is aware of the random access opportunities in a fashion known to those individuals skilled in the art (e.g., slotted ALOHA); it is further assumed for discussion of the present invention that there are no collisions during the random access opportunity (i.e., the inbound signal from a subscriber unit 100 during the random access opportunity is successfully decoded by the base station 102).

If the base station 102 determines that the subscriber unit 100 does not have at least one additional inbound signal to transmit (at step 204), the base station 102 returns to the listening mode and idly waits for an inbound signal to be transmitted on the air interface from a next subscriber unit (at step 200). If the base station determines that the subscriber unit 100, however, does have at least one additional inbound signal to transmit on the air interface, the base station 102 assigns at least one reserved access slot to the subscriber unit 100 (at step 206), and calculates a relative adjustment value for the subscriber unit 100 (at step 208). In the present invention, the relative adjustment value is the time delay between the time the base station 102 received the inbound signal from the subscriber unit 100 and the time the base station 102 expected to receive the inbound signal from the subscriber unit 100. It is important to note that while the present invention describes the base station 102 determining a time delay to calculate the relative adjustment value, other forms of measurements may be used and still remain within the spirit and scope of the present invention, such as physical distance, received modulation sample offset, number of interrupts, light-seconds, or the like.

Figure 3:
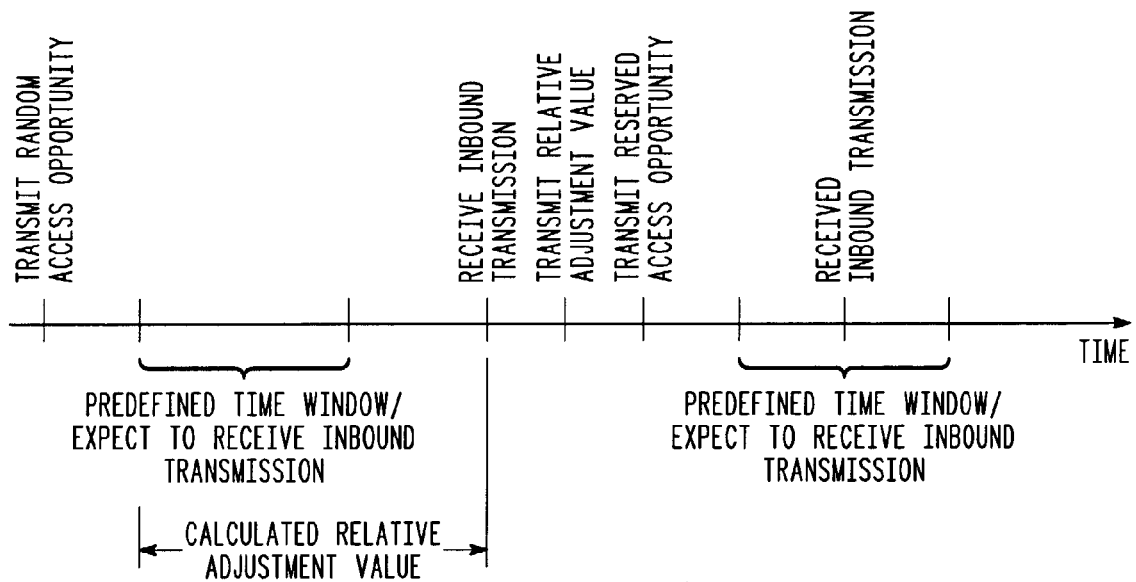
FIG. 3 illustrates a time diagram in accordance with the first embodiment of the present invention.
Figure 4:
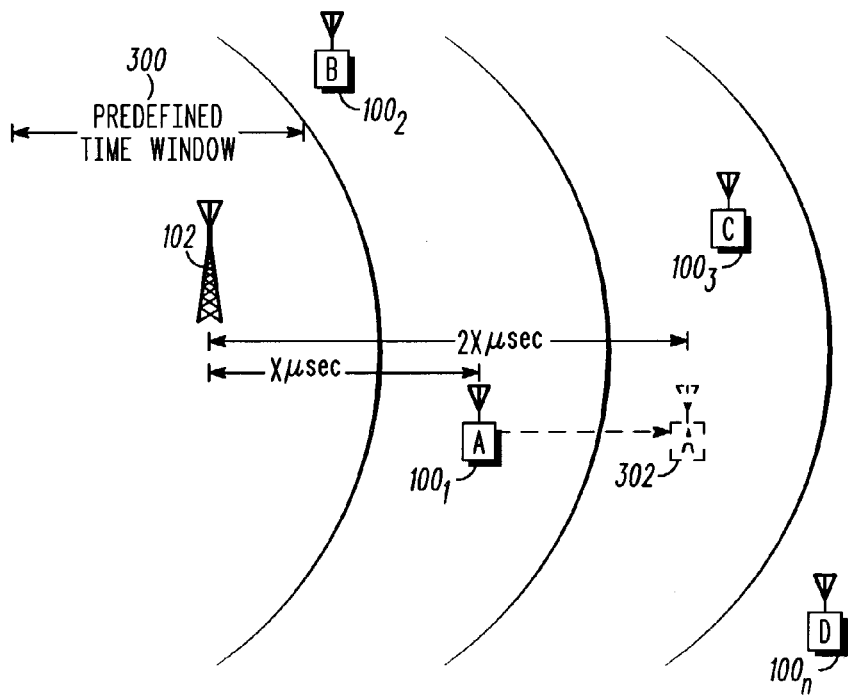
FIG. 4 illustrates a system diagram in accordance with the first embodiment of the present invention.

In the preferred embodiment of the present invention, if the inbound signal received from the subscriber unit 100 during the random access opportunity arrives within a predefined time window 300 (as illustrated in FIGS. 3 and 4), the relative adjustment value is zero; if the inbound signal received from the subscriber unit 100 during the random access opportunity arrives outside the predefined time window 300, the relative adjustment value is calculated in such a manner, using known techniques (e.g., calculating the delay between the received inbound burst synchronization from the outbound burst synchronization and then subtracting off the best-case delay; the basic measuring units can be in I/Q samples, symbol samples, etc.), to allow subsequent inbound signals from the subscriber unit 100 to arrive within the predefined time window 300 (at step 208).

Once calculated (at step 208), the base station 102 transmits the relative adjustment value and the reserved access slot reservation to the subscriber unit 100 (at step 210). The relative adjustment value and the reserved access slot reservation may be transmitted to the subscriber unit 100 during the same time slot, however, they are typically communicated in separate messages. It is important to note that in accordance with the preferred embodiment of the present invention, once the base station 102 transmits the relative adjustment value to the subscriber unit 100, the base station 102 discards the relative adjustment value (at step 212).

After the base station 102 transmits the relative adjustment value and the reserved access slot reservation to the subscriber unit 100 (at step 210), the base station 102 begins to receive inbound signals from the subscriber unit 100 on the reserved access slots (at step 214). Each time an inbound signal is received in a reserved access slot (at step 214), the base station 102 determines whether the reservation has expired; in other words, has the subscriber unit 100 used all the reserved access slots allocated to it by the base station 102 (at step 216). If the reservation has expired (at step 216), the base station 102 returns to the listening mode and idly waits for the next inbound signal on the air interface (at step 200). If, however, the reservation has not yet expired (at step 216), the base station 102 determines if the elapsed time since the last inbound signal received from the subscriber unit 100 exceeded a predetermined threshold (at step 218). If too much time has passed since the base station 102 received the last inbound signal from the subscriber unit 100, the base station 102 makes available any remaining bandwidth/slots on the reservation to other users (at step 220), and returns to the listening mode (at step 200). It is assumed that if the elapsed time since the last inbound signal received from the subscriber unit 100 exceeds a predetermined threshold (at step 218), the subscriber unit 100 completed its transmission, the subscriber unit 100 has moved out-of-range from the base station 102, or the like.

If, however, the elapsed time since the base station 102 received the last inbound signal from the subscriber unit 100 did not exceed a predetermined threshold (at step 218), the base station 102 determines if the last inbound signal received from the subscriber unit 100 arrived within the predefined time window 300 (at step 222). If the last inbound signal from the subscriber unit 100 did arrive within the predefined time window 300, the base station 102 waits to receive at least one additional inbound signal from the subscriber unit 100 on the next reserved access slot (at step 214). If, however, the last inbound signal from the subscriber unit 100 did not arrive within the predefined time window (i.e., the inbound signal arrived sooner or later than expected), the base station 102 calculates an updated relative adjustment value (positive or negative) for the subscriber unit 102 using known techniques (at step 224). The base station 102 transmits the updated relative adjustment value to the subscriber unit 100 (at step 226), and discards the updated relative adjustment value, preferably upon transmission to the subscriber unit 100 (at step 228). The base station 102 then waits to receive at least one additional inbound signal from the subscriber unit 100 on the next reserved access slot (at step 214). The base station 100 continues to loop through steps 214 through 228 until the reservation expires, or until the base station 102 does not receive any additional inbound signals from the subscriber unit 100 within a predefined time period, whichever is sooner.

Figure 5:
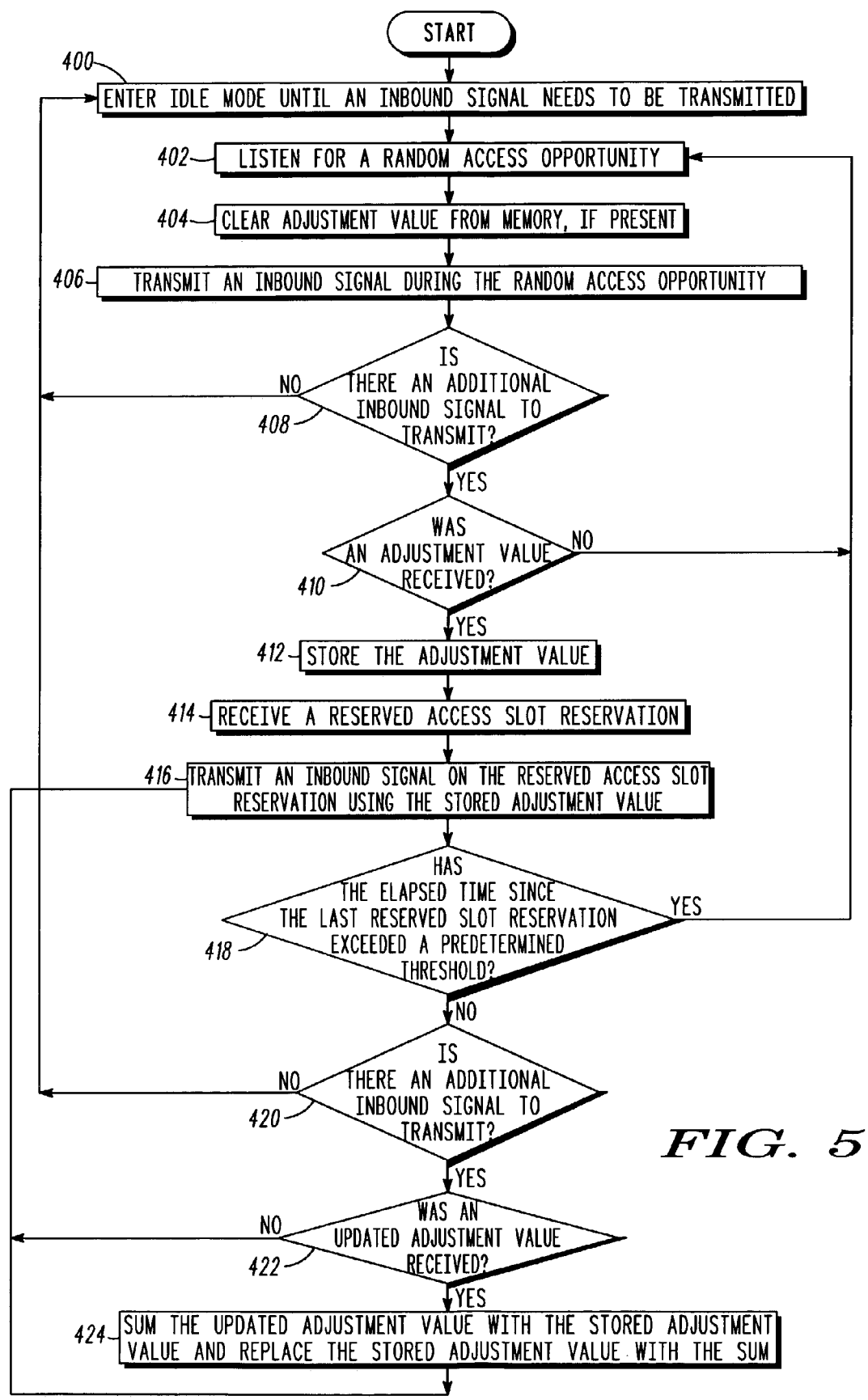
FIG. 5 illustrates a flowchart of the operation of the subscriber unit in accordance with the first embodiment of the present invention.

Let us now turn to the operation of the subscriber unit 100 in accordance with the first embodiment of the present invention. As illustrated in FIG. 5, the subscriber unit 100 enters an idle mode until an inbound signal needs to be transmitted on the air interface (at step 400). When the subscriber unit 100 needs to transmit an inbound signal, the subscriber unit 100 listens for a random access opportunity (at step 402), clears any previously stored cumulative adjustment value from its memory (at step 404), and transmits the inbound signal on the air interface during the random access opportunity (at step 406). It is important to note that when the subscriber unit 100 transmits the inbound signal during a random access opportunity, it does not use any adjustment value. It is also important to note that the subscriber unit 100 remembers its position at its first transmission (i.e., at its transmission during the random access opportunity) relative to the outbound frame synchronization. This is the typical point of reference from which the subscriber advances its inbound reserved access transmissions. The inbound signal transmitted during the random access opportunity typically requests additional bandwidth needed to transmit at least one additional inbound signal on the air interface, if needed.

If the subscriber unit 100 does not have any further inbound signals to transmit on the air interface after the random access opportunity (at step 408), the subscriber unit 100 re-enters the idle mode until an inbound signal needs to be transmitted (at step 400). If the subscriber unit 100, however, does have at least one additional inbound signal to transmit on the air interface (at step 408), the subscriber unit 100 waits to receive a relative adjustment value and a reserved access slot reservation from the base station 102 (at step 410).

If the relative adjustment value is not received from the base station 102 within a predetermined period of time after transmitting the inbound signal during the random access opportunity, the subscriber unit 100 listens for the next random access opportunity and transmits at least one inbound signal during the next random access opportunity. In the preferred embodiment of the present invention, the subscriber unit continues to transmit inbound signals during the random access opportunities until a relative adjustment value is received, or until all the inbound signals needed to be transmitted has been transmitted. When the relative adjustment value is received from the base station 102 within the predetermined period of time after transmitting the inbound signal during the random access opportunity, the subscriber unit 100 stores the relative adjustment value into memory (at step 412) as the cumulative adjustment value and waits to receive at least one reserved access slot reservation from the base station 102. Upon receipt of the reserved access slot reservation (at step 414), the subscriber unit 100 transmits inbound signals on the reserved access slots using the stored cumulative adjustment value (at step 416).

After transmitting in a reserved access slot, the subscriber unit measures the elapsed time between receipts of reserved access slots. If the elapsed time since the last reserved access slot (i.e., the elapsed time between reserved access slots) exceeds a predetermined threshold (at step 418), the subscriber unit 100 listens for the next random access opportunity (at step 402), clears the cumulative adjustment value from its memory (at step 404), and transmits the inbound signal during the random access opportunity (at step 406). If the elapsed time since the last reserved access slot has not exceeded the predetermined threshold (at step 418), the subscriber unit 100 determines if it has at least one additional inbound signal to transmit (at step 420).

If the subscriber unit 100 does not have at least one additional inbound signal to transmit, the subscriber unit 100 re-enters the idle mode until it needs to transmit an inbound signal on the air interface (at step 400). If the subscriber unit 100 does have at least one additional inbound signal to transmit, the subscriber unit 100 determines whether it received an updated relative adjustment value from the base station 102 (at step 422). If the subscriber unit 100 has not received an updated relative adjustment value from the base station 102, the subscriber unit 100 transmits an inbound signal in the next reserved access slot using the stored cumulative adjustment value. If the subscriber unit 100 has received an updated relative adjustment value from the base station 102, the subscriber unit 100 takes the stored cumulative adjustment value, sums it with the updated relative adjustment value (at step 424), replaces the stored relative adjustment value with this sum to create an updated cumulative adjustment value, and transmits at least one inbound signal on the reserved access slot using the updated cumulative adjustment value (at step 414). It is important to note that the cumulative adjustment value is a running sum of positive and/or negative relative adjustment values. When applying the cumulative adjustment value to subsequent transmissions, the subscriber unit 100 advances its transmissions when the cumulative adjustment value is a positive value, and delays its transmission when the cumulative adjustment value is a negative value. It should be obvious to those skilled in the art that the polarity of the cumulative adjustment value is immaterial as long as the convention is known a priori between the subscriber unit and the base station (e.g., the base station can negate the relative adjustment values and the subscriber unit would apply the cumulative adjustment value to subsequent transmissions by delaying its transmissions when the cumulative adjustment value is a positive value, and advancing its transmission when the cumulative adjustment value is a negative value). The subscriber unit 100 continues to loop through steps 414 through 422 until the elapsed time since the last reserved access slot exceeds a predetermined threshold, or until the subscriber unit 100 does not have any additional inbound signals to transmit on the air interface, whichever is sooner.

It is important to note that each time the subscriber unit 100 receives an updated relative adjustment value from the base station 102, the subscriber unit 100 updates its memory by keeping a cumulative sum of the previously received relative adjustment values. It is also important to note that the subscriber unit 100 does not use any adjustment value when transmitting inbound signals on the air interface during a random access opportunity in accordance with the present invention; the subscriber unit 100 only applies the cumulative adjustment value to its transmissions when transmitting on a reserved access slot. The subscriber unit 100 clears the cumulative adjustment value from memory, or, for example, sets it to zero, prior to transmitting the inbound signal during a random access opportunity.

Let us now look at an example of the present invention. Referring back to FIGS. 3 and 4, subscriber unit A $100_1$ needs to transmit the inbound signal on the air interface. Subscriber unit A $100_1$ waits for a random access opportunity, clears the cumulative adjustment value stored in memory, and transmits its inbound signal without using any adjustment value. In this example, subscriber unit A $100_1$ requests additional bandwidth during the random access opportunity to transmit at least one additional inbound signal.

Upon receipt of the inbound signal, the base station 102 determines that subscriber unit A $100_1$ has at least one additional inbound signal to transmit on the air interface based on the inbound signal transmitted during the random access opportunity. As a result, the base station 102 assigns reserved access slots to subscriber unit A $100_1$ dependent at least partially upon the amount of bandwidth needed/requested by subscriber unit A $100_1$. In this example, the base station 102 also determined that the inbound signal received from subscriber unit A $100_1$ during the random access opportunity arrived outside the predefined time window 300 by X μsecs. (e.g., 50 μsecs). As a result, the base station 102 transmits a relative adjustment value to subscriber unit A $100_1$ instructing subscriber unit A $100_1$ to advance its transmit time by X μsecs., and also transmits to subscriber unit A $100_1$ the reserved access slot reservation. The base station 102 discards the relative adjustment value upon transmission to subscriber unit A $100_1$.

Subscriber unit A $100_1$ sums the cumulative adjustment value upon receiving the relative adjustment value, and begins transmitting inbound signals on the reserved access slots using the cumulative adjustment value. Let us now assume in this example that subscriber unit A $100_1$ begins to move further away from the base station 102 after transmitting in n number of reserved access slots (to location 302 as illustrated in FIG. 1). As a result, when subscriber unit A $100_1$ transmits in the next reserved access slot using the cumulative adjustment value, the inbound signal arrives outside the predefined time window 300 (i.e., arrives later than expected) at the base station 102. The base station 102 calculates the time delay between the time the base station 102 received the inbound signal from subscriber unit A $100_1$ and the time when the base station 102 expected to receive the inbound signal from subscriber unit A $100_1$, which in this example is now 2X μsec. Once calculated, the base station 102 transmits an updated relative adjustment value to subscriber unit A $100_1$, and discards the updated relative adjustment value upon transmission. Subscriber unit A $100_1$ sums the updated relative adjustment value with the cumulative adjustment value in memory and continues to transmit inbound signals on the reserved access slots using the sum until the elapsed time since the last reserved access slot exceeds a predetermined threshold, or until subscriber unit A $100_1$ does not have any additional inbound signals to transmit on the air interface, whichever is sooner. The base station 102 continues to monitor the arrival time of the inbound signals from subscriber unit A $100_1$ and continues to provide updated relative adjustment values to subscriber unit A $100_1$ when its inbound signals arrive outside of the predefined time window 300 until the slot reservation expired, or until the elapsed time since the last inbound signal received from subscriber unit A $100_1$ exceeds a predetermined threshold, whichever is sooner.

Let us now discuss the second embodiment of the present invention in which the subscriber unit 100 comprises a synchronized clock with the base station (e.g., the subscriber unit comprising a GPS receiver). In accordance with the present invention, if the subscriber unit 100 does comprises a synchronized clock with the base station, the base station 102 does not need to provide the subscriber unit with adjustment values. In the preferred embodiment, the base station 102 and the subscriber unit 100 have a one pulse per second ("1 PPS") that occurs with a very low margin of error at the same time at both the subscriber unit 100 and the base station 102, however, an alternative number of pulses per second may be used. The base station 102 always transmits each of its synchronization signaling pattern(s) (e.g., a slot synchronization and optionally a slot identifier, a periodic frame synchronization, etc.) at the same position relative to its 1 PPS. The subscriber unit 100 is preprogrammed with the reference point of where to expect the outbound synchronization signaling relative to its 1 PPS. Thus, in the second embodiment of the present invention, the subscriber unit 100 simply needs to keep track of the delay between when it receives the outbound synchronization values relative to when it received its own 1 PPS. The subscriber unit 100 advances its transmissions by twice the time delay measured from the base station 102 relative to when it receives the outbound synchronization. Alternatively, the subscriber unit 100 may advance its transmissions by the time delay measured from the base station 102 relative to when the base station 102 expects to receive the inbound signal. Thus, the second embodiment of the present invention does not require outbound signaling of the adjustment value. As such, the second embodiment does not impede the throughput of the system, and since there is no worry of correctly receiving an adjustment value at the subscriber unit 100, recovery time is not an issue.

Alternatively, in a system where the GPS coordinates of the base station 102 are broadcast as part of the protocol, the subscriber unit 100 can determine the precise distance between itself and the base station 102. The time delay for the main path could then be calculated based on the main path distance.

While the invention has been described in conjunction with specific embodiments thereof, additional advantages and modifications will readily occur to those skilled in the art. For example, if the subscriber unit 100 does not receive the adjustment value within the predefined period of time after transmitting the inbound signal during the random access opportunity (at step 410), but does receive a reserved access slot reservation from the base station 102, the subscriber unit 100 can assume that the relative adjustment value is zero and proceed to transmit additional inbound signals on the reserved access slots without using an adjustment value until a relative adjustment value is received or until the subscriber unit 100 does not have any additional inbound signals to transmit. The invention, in its broader aspects, is therefore not limited to the specific details, representative apparatus, and illustrative examples shown and described. Various alterations, modifications and variations will be apparent to those skilled in the art in light of the foregoing description. Thus, it should be understood that the invention is not limited by the foregoing description, but embraces all such alterations, modifications and variations in accordance with the spirit and scope of the appended claims.

It should be noted that the term "a" or "an", as used herein, are defined as one or more than one. The term "plurality", as used herein, defined as two or more than two. The term "another", as used herein, is defined as at least a second or more. The terms "including" and/or "having", as used herein, are defined as comprising (i.e., open language).

We claim:

1. A method comprising the steps of:
providing a cumulative adjustment value in memory;
transmitting an inbound signal to a base station during a random access opportunity;
receiving a relative adjustment value from the base station;
summing the relative adjustment value with the cumulative adjustment value to create a new cumulative adjustment value;
storing the new cumulative adjustment value in the memory; and
transmitting a subsequent inbound signal using the new cumulative adjustment value during a reserved access opportunity.

2. The method of claim 1 wherein the inbound signal comprises at least one of voice, data, and control.

3. The method of claim 1 wherein the cumulative adjustment value is set to an initial relative adjustment value received from the base station, and wherein the inbound signal is transmitted to the base station using the cumulative adjustment value.

4. The method of claim 1 wherein the cumulative adjustment value is set to a default value prior to the step of transmitting the inbound signal.

5. The method of claim 1 wherein when the cumulative adjustment value is a positive value, the step of transmitting the subsequent inbound signal is delayed in time by the cumulative adjustment value.

6. The method of claim 1 wherein when the cumulative adjustment value is a positive value, the step of transmitting the subsequent inbound signal is delayed by the cumulative adjustment value.

7. The method of claim 1 wherein when the cumulative adjustment value is a positive value, the step of transmitting the subsequent inbound signal is advanced by the cumulative adjustment value.

8. The method of claim 1 wherein when the cumulative adjustment value is a negative value, the step of transmitting the subsequent inbound signal is delayed by the cumulative adjustment value.

9. The method of claim 1 wherein when the cumulative adjustment value is a negative value, the step of transmitting the subsequent inbound signal is advanced by the cumulative adjustment value.

* * * * *